Feb. 28, 1967   J. R. BAILEY   3,306,154
COMPRESSIVE LOAD LIMIT INDICATORS
Filed Oct. 23, 1965
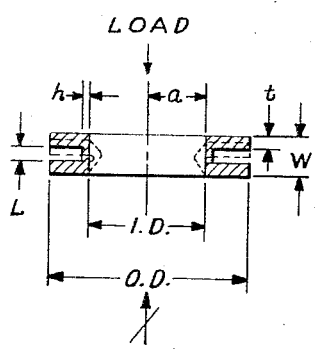
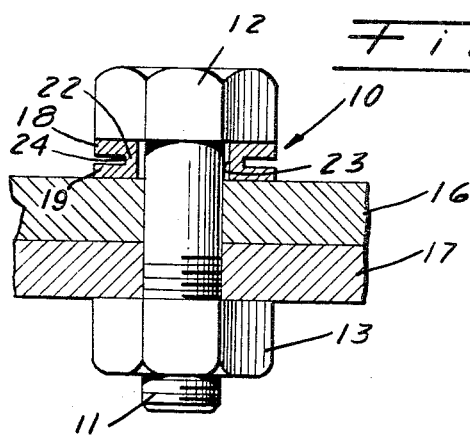
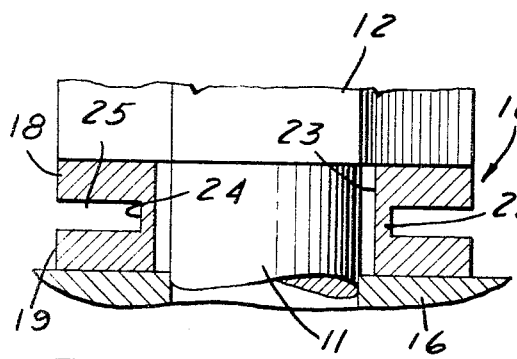
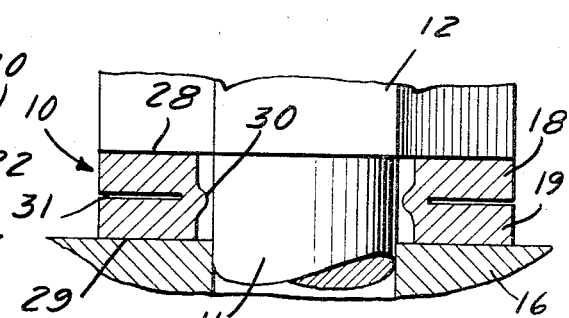
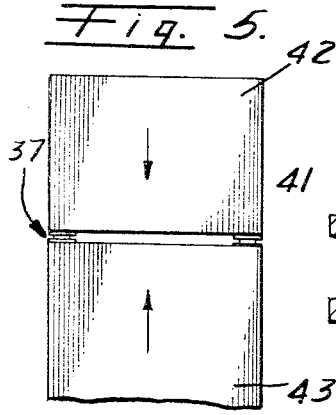
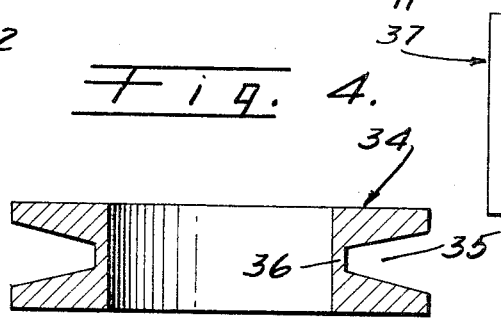
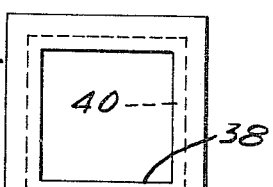
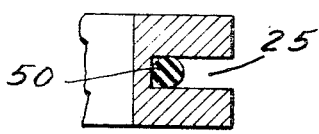
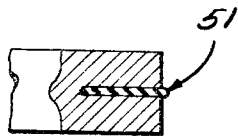
Jay R. Bailey,
INVENTOR.
WHANN & McMANIGAL
Attorneys for Applicant United States Patent Office 3,306,154
Patented Feb. 28, 1967

3,306,154
COMPRESSIVE LOAD LIMIT INDICATORS
Jay R. Bailey, Woodland Hills, Calif., assignor to McCulloch Corporation, Los Angeles, Calif., a corporation of Wisconsin
Filed Oct. 23, 1965, Ser. No. 506,448
4 Claims. (Cl. 85—62)

This is a continuation-in-part of application Serial No. 58,480, filed September 26, 1960, now abandoned.

This invention relates to a device for measuring a compressive load limit on opposing parts, and more particularly, to a preload washer for indicating when a proper torque has been applied to tighten a particular bolt.

Torque wrenches have been widely used to tighten bolts but they have been found to be inaccurate, and to consequently torque the bolts considerably on the low side of the bolt yield strength. In many applications bolts have been found to be torqued to an average of only 40 to 50 percent of the bolt yield strength to prevent possible overstressing. This wide margin or error in torque wrenches has hampered the effectiveness of structural connections and considerably limited maximum bolt life in fatigue.

It is an object of the invention to provide a device for measuring a compressive load limit on opposing parts.

It is another object of the invention to provide an improved preload washer and a method for making the same.

It is still another object of the invention to provide a relatively thin preload washer for indicating when a predetermined torque has been applied to tighten a bolt. Where space is at a premium, a thin washer, according to the invention, is particularly desirable or even necessary.

It is a further object of the invention to provide a preload washer in which predetermined loading on the washer can be observed by an operator to an accuracy of greater than 10 percent of the load.

It is a still further object of the invention to provide a preload washer which can be used by an unskilled operator and in which the predetermined loading or torque is indicated to be observed visually. That is, when a predetermined torque has been applied to tighten a bolt, for example, the operator can determine this by merely sighting or feeling the washer.

It is another object of the invention to eliminate the use of torque wrenches in situations where a preload washer can be observed or felt while torque is being applied to a bolt to tighten it.

It is still another object of the invention to provide a thin H-shaped washer, having a cylinder spacing two parallel flanges, the three members forming the H shape, the cylinder deforming radially inwardly when the plastic load limit on the washer is exceeded, and the flanges moving close together to indicate the same.

Further objects and advantages of the invention may be brought out in the following part of the specification wherein small details have been described for the competence of disclosure, without intending to limit the scope of the invention which is set forth in the appended claims.

Referring to the accompanying drawings which are for illustrative purposes:

FIG. 1 is a side elevational view in partial cross-section illustrating the position of a preload washer, according to the invention, on an untightened bolt which is in position to secure two metal plates together;

FIG. 2 is an enlarged fragmentary view illustrating the preload washer shown in FIG. 1;

FIG. 3 is a cross-sectional view of a washer in a compressed condition resulting from the tightening of the bolt and indicating that the bolt has been tightened to its maximum safe load;

FIG. 4 is a cross-sectional view of a preload washer having a V-shaped peripheral groove;

FIG. 5 is a fragmentary side elevational view illustrating the use of preload devices according to the present invention and positioned to measure the compressive load limit between two opposing parts;

FIG. 6 is a plan view of another form of the invention;

FIG. 7 is a vertical sectional view illustrating a preloaded washer incorporating an indicating means;

FIG. 8 is a fragmentary sectional view showing the form of the invention illustrated in FIG. 7, in the loaded position; and FIG. 9 is a cross-sectional view of a preload washer, as shown in FIG. 1, having dimensional indicia thereon.

Referring again to the drawings, in FIGS. 1-3 there is illustrated a preload washer 10, according to the present invention, surrounding a bolt 11 having a head 12 at one end and a nut 13 at its threaded end. In FIGS. 1 and 2, the nut and bolt are in position to be tightened so as to secure the two opposite plates 16 and 17 together.

The preload washer 10 is comprised of two generally circular flanges 18 and 19 which are integrally joined by a cylinder or spacer 22 having a length and width predetermined as a function of the predetermined load to be applied to properly tighten the nut and bolt on the plates. The internal surface of the spacer 22 is formed to be flush with the central generally cylindrical opening 23 of the washer and which is designed to be oversized relative to the bolt. The external surface 24 of the spacer 22 forms the circumferential surface of the washer or the base of the slot-shaped portion 25 between the two flanges 18 and 19.

In FIG. 3, the nut and bolt are shown to have been tightened to secure the plates 16 and 17 together and sufficient torque has been applied in tightening the bolt to apply the proper compressive forces on the upper and lower flat faces 28 and 29 of the washer so as to deflect the spacer 22 radially inwardly into the space between the washer and the bolt, forming the annular bead 30.

Simultaneously with this action, the flanges 18 and 19 are moved into a closer relationship so as to be spaced by a narrow slot 31. When the slot is so narrowed the predetermined maximum safe tensile load has been applied to the bolt in the tightening of the nut thereon, or stated differently, when the washer is deflected to diminish the slot to the narrow width indicated at 31, this is an indication that the tensile preload of the bolt has been applied by the tightening process.

It has been found that under a given compressive load the spacer 22, typically cylindrical in a washer, reaches its elastic limit. Then as the load is increased, plastic deformation occurs in the spacer and the sides of the slot approach one another, forming the radially inwardly extending bead 30. According to the invention, the washer 10 is designed so that the plastic yielding or deflection occurs in the flat portion of the stress-strain curve, for a particular washer, just before the slot closes; that is, the plastic yielding occurs in the so-called flat portion of the curve where a small percentage, generally less than 10 percent of the total pressure on the washer, causes a great amount of deflection. Hence, on the curve for a relatively wide band of deflection, the compressive load on the washer or the tensile load on the bolt remains essentially constant. Therefore, the operator need not be skilled but it is required that he be able to see or feel the washer as it is compressed and that he stop tightening the bolt before the slot is closed completely. No measurement of the substantially closed slot is necessary because the load varies very little between a 75 percent to a 95 percent reduction in the gap between the flanges 18 and 19.

Washers, as 10, that have spacers or cylinders 22 that deform radially inwardly are relatively thin and such washers are particularly desirable for use where space and weight are at a preminum. It is of great advantage to have the spacer deform inwardly rather than to buckle outwardly in that the former allows a practically constant load from the inception of the plastic deformation up to the point where the two flanges 18 and 19 touch. This makes it very easy for the operator to determine when the proper force has been applied, the determination being either made visually or by feel. If the washer were made so as to have the spacer buckle outwardly, the actual buckling would be more difficult to determine, and it would be particularly difficult to determine by feel in that the flanges would not be brought as closely together when the proper load had been applied. Further, if the spacer should buckle outwardly, rather than deform inwardly, the metal would be moved between the flanges and would cause the force required to move the flanges together to be changed. That is, the load would not be constant.

To understand the invention, it must be seen that buckling does not occur during the plastic deformation of the spacer 22. Here, the deformation is radially inward whereas in the buckling of a typical cylinder, buckling occurs radially outwardly. Buckling of a cylinder is associated with the stability of the cylindrical shell under compressive loads. At some particular compressive load in the axial direction outward buckling, symmetrical with respect to the axis of the cylinder, occurs. The radial displacements during buckling are induced by strains in a circumferential direction. The magnitude of these lateral or circumferential strains depends upon the Poisson strain ratio. At the critical compressive load the induced circumferential strain, from the Poisson effect, produces hoop stresses which apparently exceed the proportional limit of the unsupported portion of a shell. Buckling results from these large radial strains and the cylinder shortens. The buckling direction is outward because the induced circumferential strain is in the opposite sense, that is, negative, to the compressive strain.

Buckling can occur in the elastic or plastic range of a cylinder up to approximately the proportional limit of the material. The length of the waves of a buckled shell becomes shorter and shorter for buckling beyond the proportional limit until finally the mode of failure depends upon the simultaneous action of compressive and bending forces instead of upon stability, and deformation radially inwardly occurs when the length of the cylinder is shorter than the length of critical buckling for the cylinder.

Considering FIGS. 1, 2 and 3, the action of the compressive loads on the faces of the flanges lies along a circumferential line which has a greater diameter than the cylindrical shell or spacer 22. Hence, in resolving the loads along the cylinder, toroidal moments act on the ends of the shell in the direction which induces compressive stresses in the outer surface of the cylinder and tensions in the inner surface. Under the combined action of the compressive load and these toroidal moments, there is a critical load-cylinder length combination where the radial strains produce negative hoop stresses which exceed the proportional limit of the shell in radial compression. Inward deformation then occurs and the cylinder shortens.

In order to provide a washer having a spacer 22 which will deform radially inwardly at a given compressive load on the washer, the length of the spacer must be less than the length of the first half wave at which the spacer will buckle. Equations for determining the critical length of a cylinder at and above which it buckles outwardly, in contrast to deforming radially inwardly, are found in "Theory of Elastic Stability," 1st ed., by Timoshenko, page 442, Equations 269 and 263. These equations are:

$$S_{cr}* = \frac{E_r h}{a\sqrt{3(1-N^{2**})}}$$

*Sigma.
**Nu.

or $$E_r = \frac{S_{cr} a \sqrt{3(1-N^2)}}{h}$$

$$\frac{L}{m} = \frac{L}{2} = \pi \sqrt[4]{\frac{a^2 h^2}{12(1-N^2)}} \sqrt[4]{\frac{E_r}{E}} \approx 1.72\sqrt{ah} \sqrt[4]{\frac{E_r}{E}}$$

in which, $S_{cr}$ is the critical buckling stress of the cylinder or spacer, or defined in another way, is the stress in pounds per square inch obtained by dividing the compressive load, at which buckling starts to occur, by the cross-sectional area of the cylinder; $E_r$ is the reduced modulus of elasticity in pounds per square inch; since in this application the length of the cylinder is extremely short, buckling occurs beyond the proportional limit; in other words, the cylinder is stressed beyond the elastic region where the material deforms according to Hooke's law (stress proportional to strain law) and deforms plastically; in the plastic range, the strain increases at a faster rate than the stress; hence, the modulus of elasticity, the ratio of stress over strain, is considerably less than the elastic modulus of elasticity; this reduced modulus of elasticity can be obtained from the second equation by substituting the proportional limit stress for $S_{cr}$; $a$ is the mean radius of the cylinder or spacer in inches, as shown in FIG. 9; N is Poisson's ratio, defined as the ratio of transverse strain to axial strain, which is the strain in the direction of the force; $h$ is the wall thickness of the cylinder in inches; $L/m$ is the length of the half waves into which the cylinder buckles, that is, the number of half waves of buckle, where L is the critical length, below which it will not buckle, of the cylinder or spacer in inches and $m$ is the number of half waves of the buckle; hence, for the first buckle $$L/m = L/2$$

and E is the elastic modulus of elasticity in compression.

The equations do not specifically indicate when a spacing cylinder will deform inwardly, rather than buckle radially outwardly, but they provide a solution for the central length of such a cylinder, below which it will not buckle. Below this length L, according to the invention, the spacer 22 will deform radially inwardly. The same applies to the structure shown in FIG. 6.

For a thin washer, from the practical point of view, there are three variables, $a$, $h$, and L. The outside diameter of the flanges is generally determined by the size of the bolt head, as indicated in FIG. 1, and the inside diameter is determined by the diameter of the bolt. The inside diameter must be larger than the bolt a sufficient amount so that the deformation at 30, as shown in FIG. 3, does not make contact with the bolt. That is, the bead 30 must be free of any stopping surface. It has been found that the deformation reduces the inside diameter an amount equal to twice the length L of the spacer. Thus, where L is 0.060 of an inch, the inside diameter would be reduced 0.120 of an inch. The thickness of the flanges 18 and 19 is not critical and thus, the height of the washer is determined by the length L of the spacer.

To determine the length of the spacer where it deforms inwardly and where the washer is made of substantially any steel, the following data with respect to FIG. 9 was used:

O.D. = 0.375"
I.D. = 0.220"
$W = 0.094"$
$h = 0.012"$ $$a = 0.110 + \frac{0.012}{2} = 0.116"$$

Then solving for $E_r$, where for a typical steel under consideration, $S_{cr}$ equals 70,000 p.s.i., N equals 0.26, and E equals $29 \times 10^6$ p.s.i., $$E_r = \frac{70{,}000 \times .116\sqrt{3(1-.26^2)}}{.012} = 1.13 \times 10^6 \text{ p.s.i.}$$

and then solving for the critical L, $$\frac{L}{m} = \frac{L}{2} = 1.72\sqrt{.116 \times .012}\sqrt[4]{\frac{1.13 \times 10^6}{29 \times 10^6}} = 0.0285$$

and $L = 0.057"$, the length of the spacer 22 below which it will not buckle.

Consistent with the foregoing, under test conditions for washers of the same material and dimensions, except for L, with spacer lengths of 0.030" and 0.045", the spacers 22 did not buckle but deformed inwardly to form the bead 30. Washers having spacer lengths of 0.060", 0.075", 0.090" and 0.125" buckled outwardly. Thus, for a spacer length of less than 0.057" for the material having the characteristics and dimensions shown, the spacer deforms radially inwardly according to the invention.

It has been found that hardening the faces 28 and 29 of the washer, possible errors introduced in the deflection by galling the surface of the washer can be eliminated. Also hardened faces are more resistant to stresses produced by flat plate loads on the washer if it is made from a soft steel, a nonferrous metal or plastic and where the bolt hole in the material under the washer is oversized.

In the manufacture of the washers it has been found that an inexpensive low carbon free machining steel, such as B1113 is particularly desirable in that for a hardness of $R_B$ 80 it has a load change of less than 10 percent for a deflection equivalent to 25 percent of the total deflection from zero to the ultimate load.

To make the washers from such a material, round stock is turned and drilled to have the correct outside diameter and inside diameter and it is then peripherally grooved at equal spaces longitudinally along the stock, the spaces between the grooves being great enough to allow for final washer thickness plus waste machining stock. After the grooves have been cut, the entire circumferential surface, including the surfaces forming the slots, are plated with a relatively nonporous metal, such as copper or nickel, the purpose of the plating being to prevent hardening of the surfaces of the washer other than those of the flat end surfaces 28 and 29. After the plating operation has been completed, the individual washers are cut from the stock and the aforesaid end surfaces are cyanide hardened. Washers so made are particularly desirable for use on aircraft and on engine cylinder bolts.

In FIG. 4, another form of the invention is shown in which the washer 34 has a peripheral groove 35 of V-shape. The cylindrical spacer portion 36 deflects in the same manner under the predetermined compressive load as does the spacer 22, discussed above.

In FIGS. 5 and 6, there is illustrated a preload device 37, similar to the washer 10, the principal difference being that the latter has a rectangular configuration in plan view and a rectangular opening 38. Extending outwardly from the opening 38 is a spacer 40 and in the same manner, as above, outwardly of the latter is peripheral slot 41. Preload devices, such as 37, but of varying shapes may be used when spaced between two opposing parts 42 and 43, for example, for indicating or limiting the compressive load between them. Such preload devices would be particularly useful in the setting up of jigs, for example.

In FIG. 7, I have disclosed a loading indicating means in the form of a deformable element, such as an O-ring 50, which is positioned in the bottom of the groove or slot-shaped portion 25. When the securing means, such as the nut 12 shown in FIG. 2, is tightened, and the preload washer deformed into a shape such, for example as shown in FIG. 3, the groove 25 has been reduced in width, as shown, and the indicating ring 50 has been deformed so that it will project slightly from the slot 25 as indicated at 51 in FIG. 8. This will visually indicate to the operator that the proper load has been imposed.

It is clear that preload devices of unitary construction may be made in various other forms and methods without departing from the inventive principles disclosed herein. I do not wish to be restricted to the specific forms shown or uses mentioned except as defined in the accompanying claims, wherein various portions have separated for clarity of reading and not for emphasis.

I claim:

1. A preload washer for indicating when a predetermined torque has been applied to tighten a bolt comprising:
    (a) a disc having an open central portion therethrough to receive a bolt; and
    (b) a peripheral groove extending inwardly from the circumferential surface of said disc,
    (c) said groove spacing the upper and lower portions of said disc to form flanges at both ends,
    (d) said flanges being integral with a radially inwardly deformable, generally cylindrical spacer extending between the open central portion and the inner periphery of said groove,
    (e) said spacer being pressure responsive to form a bead extending into said open central portion when said flanges are compressed toward each other to substantially narrow said groove,
    (f) the bead being formed free of stopping surfaces within said central portion after the elastic limit of the spacer has been exceeded by said compression and plastic yielding has occurred,
    (g) said spacer having a length less than the value of L found by solving therefor in the following equations:

$$E_r = \frac{S_{cr} a \sqrt{3(1-N^2)}}{h}$$

$$\frac{L}{2} \approx 1.72\sqrt{ah}\sqrt[4]{\frac{E_r}{E}}$$

where $S_{cr}$ is the critical buckling stress in the spacer material or is the stress in pounds per square inch obtained by dividing the compressive load, at which buckling starts to occur in the material, by the cross-sectional area of the spacer; $E_r$ is the reduced modulus of elasticity in pounds per square inch; $a$ is the mean radius of the spacer in inches; N is Poisson's ratio of the material in the spacer; $h$ is the wall thickness of the spacer in inches; and E is elastic modulus of elasticity in compression of the material in the spacer.

2. The invention according to claim 1 including deformable indicating means positioned in said peripheral groove, said indicating means being deformed when said flanges are compressed toward each other to substantially narrow said groove.

3. In combination, at least two or more parts in a compressible relationship, means cooperating with said parts to indicate a predetermined compressive load limit thereon, said means comprising:
    (a) a body having an open central portion;

(b) a peripheral groove in said body extending inwardly toward said central portion; and
(c) a deformable spacing portion forming the outer periphery of said body within said groove and having its inner surface on the periphery of said open central portion,
(d) said spacing portion being pressure responsively deformable to form a bead extending into said open central portion and free of stopping surfaces when said body is compressed to substantially narrow said groove,
(e) the bead being formed after the elastic limit of the spacing portion has been exceeded by said compression and plastic yielding has occurred,
(f) said spacing portion being cylindrical and its length being less than the value of L found by solving therefor in the following equations:

$$E_r = \frac{S_{cr} a \sqrt{3(1-N^2)}}{h}$$

$$\frac{L}{2} \approx 1.72\sqrt{ah}\sqrt[4]{\frac{E_r}{E}}$$

where $S_{cr}$ is the critical buckling stress in the spacing portion material or is the stress in pounds per square inch obtained by dividing the compressive load, at which buckling starts to occur in the material, by the cross-sectional area of the spacing portion; $E_r$ is the reduced modulus of elasticity in pounds per square inch; $a$ is the mean radius of the spacing portion in inches; N is Poisson's ratio of the material in the spacing portion; $h$ is the wall thickness of the spacing portion in inches; and E is elastic modulus of elasticity in compression of the material in the spacing portion.

4. A method to indicate a predetermined compressive load on two parts in a compressible relationship having a predetermined load indicator therebetween, comprising:
  (a) applying a compressive pressure to said parts to exceed the elastic limit of said indicator;
  (b) applying additional compressive pressure to said parts so as to cause plastic deflection to a spacing portion of said indicator in a pressure range where approximately ten percent of the total pressure causes a great amount of plastic deflection, said indicator having an open-ended central portion forming an inner surface of said spacing portion, a peripheral groove in said indicator extending inwardly toward said central portion, said spacing portion extending from said inner surface to the surface forming the inner end of said groove,
  (c) said plastic deflection of said spacing portion being inwardly into said open-ended central portion to form a bead along and extending into said open-ended central portion;
  (d) determining when approximately ten percent of the total pressure has caused a great amount of plastic deflection to form said bead; and
  (e) maintaining said bead free of stopping surfaces within said open-ended central portion;
  (f) the spacing portion, before deflection, having a length less than the value of L found by solving therefor in the following equations:

$$E_r = \frac{S_c a \sqrt{3(1-N^2)}}{h}$$

$$\frac{L}{2} \approx 1.72\sqrt{ah}\sqrt[4]{\frac{E_r}{E}}$$

where $S_{cr}$ is the critical buckling stress in the spacing portion material or is the stress in pounds per square inch obtained by dividing the compressive load, at which buckling starts to occur in the material, by the cross-sectional area of the spacing portion; $E_r$ is the reduced modulus of elasticity in pounds per square inch; $a$ is the mean radius of the spacing portion in inches; N is Poisson's ratio of the material in the spacing portion; $h$ is the wall thickness of the spacing portion in inches; and E is elastic modulus of elasticity in compression of the material in the spacing portion.

References Cited by the Examiner

UNITED STATES PATENTS

| | | | |
|---|---|---|---|
| 1,872,497 | 8/1932 | Rabezzana | 151—21 |
| 2,464,152 | 3/1949 | Ralston | 85—62 |
| 2,570,863 | 10/1951 | Rowe | 85—62 |
| 3,021,747 | 2/1962 | Garrett | 85—62 |
| 3,060,731 | 10/1962 | Adise | 85—62 |
| 3,174,386 | 3/1965 | Lewis | 85—62 |

FOREIGN PATENTS

| | | |
|---|---|---|
| 774,574 | 5/1957 | Great Britain. |
| 774,575 | 5/1957 | Great Britain. |
| 797,729 | 7/1958 | Great Britain. |

CARL W. TOMLIN, *Primary Examiner.*

EDWARD C. ALLEN, *Examiner.*